United States Patent [19]

Jurschak

[11] 3,872,253

[45] Mar. 18, 1975

[54] SIGNAL TRANSMISSION AND SURVEILLANCE SYSTEM USING A SUBSCRIBER'S TELEPHONE LINE WITHOUT INTERFERING WITH NORMAL TELEPHONE LINE OPERATION

[76] Inventor: John J. Jurschak, 825 Casazza Dr., Reno, Nev. 89502

[22] Filed: Aug. 3, 1973

[21] Appl. No.: 385,277

Related U.S. Application Data

[63] Continuation-in-part of Ser. No. 256,464, May 24, 1972, abandoned.

[52] U.S. Cl. .................................................. 179/5 R
[51] Int. Cl. .......................................... H04m 11/04
[58] Field of Search ........... 179/5 R, 17 A; 340/227, 340/164 R, 164 A

[56] References Cited

UNITED STATES PATENTS 3,757,323 9/1973 Pintell ................................ 179/5 R

*Primary Examiner*—Ralph D. Blakeslee
*Attorney, Agent, or Firm*—Hiram A. Sturges

[57] ABSTRACT

An electronic signal transmission system of the carrier-current type designed to be connected to a subscriber's telephone line for automatically transmitting information of the existence of an event to a distant location via this line. In addition to inherent diagnostic features, the system averts otherwise interfering line voltage modulation thus dissembling its presence to the subscriber and telephone system.

10 Claims, 16 Drawing Figures

SIGNAL TRANSMISSION AND SURVEILLANCE SYSTEM USING A SUBSCRIBER'S TELEPHONE LINE WITHOUT INTERFERING WITH NORMAL TELEPHONE LINE OPERATION

This application is a continuation-in-part of the applicant's co-pending patent application Ser. No. 256,464, filed 5-24-72 now abandoned, and titled: SIGNAL TRANSMISSION AND SURVEILLANCE SYSTEM USING A SUBSCRIBER'S TELEPHONE WITHOUT INTERFERING WITH NORMAL TELEPHONE LINE OPERATION.

FIELD OF THE INVENTION

This invention relates in general to signal transmission systems for sending event signals, and particularly those representing alarm conditions, over conventional telephone lines which are used for normal telephone communication.

DESCRIPTION OF THE PRIOR ART

The telephone system has, from its inception, been recognized as a prime means for relaying event signals, particularly the reporting of emergency events such as burglar and fire alarm signals. Several types of transmission systems employing telephone lines have been used for accomplishing this purpose, but differ from my invention in ways that are important, as explained hereafter.

In the prior art, the well-known automatic-telephone-dialer has been used extensively for reporting burglar and fire alarm signals. In general, upon the occurrence of an alarm, such a system seizes the telephone line, responds to operational signals produced in the telephone system, automatically dials a predetermined number address, and upon connection with a preselected station, transmits a suitable signal and/or aural message to notify the called station of the detected emergency condition. After the emergency dialer-system message is received by the called station, or stations, the system restores the telephone instrument to its prior status so that it isn't rendered unuseable for inordinate periods of time.

A desirable feature of the prior art automatic-telephone-dialer system is that it need only be connected to the line at the subscriber end and doesn't necessitate any additional telephone line connections or modifications to the central office equipment and is compatible with all dial-central-office (DCO) telephone systems. However, a significant disadvantage of automatic-telephone-dialer systems is that they do not provide "assured" event sending, e.g. a telephone line malfunction such as a short, or severance, renders such a system inoperative with the system having no provision to make a receiver station aware of the malfunction. In many applications, such automatic-telephone-dialer systems are unduly unreliable, in my opinion, as they are too vulnerable to being made inoperative by natural phenomena and easy to defeat by a burglar or vandal.

The standard method of realizing assured alarm signal transmission is to employ a leased telephone line used only for alarm signal sending. The disadvantage of such resides in the expense of a separate line exclusively for alarm signal sending, particularly when transmission distances are considerable.

The aforementioned automatic-telephone-dialer vulnerability may be compensated for to some extent by employing "operational status" reporting to monitor the overall operational condition. This involves the automatic-telephone-dialer periodically calling an anticipating station thereby making known to such, the overall operational status, e.g. absence of a report would manifest a malfunction.

An alternate method of malfunction detection is to reverse the calling direction; this is done by periodically calling the automatic-telephone-dialer location with such acknowledging the call and thereby making known the overall operational status of the system, e.g. no acknowledgement would indicate a failure.

These two means of malfunction detection have the advantage that no electrical connection to or modification of the telephone exchange equipment is necessary, but have the decided disadvantage of reducing the effective trunkage of the telephone system, i.e. the ratio of the number of available channels per subscriber.

Two patented telephone alarm transmission systems which are not of the automatic-telephone-dialer type are known to me; both have a fundamental similarity to my invention. The common feature to my system being that these two prior art systems each send signals over an operational telephone line from the customer's premises and receive these signals prior to the telephone central office, thereby functionally by-passing the central office instead of going through it to another subscriber, i.e. alarm receiving station, as in the automatic-telephone-dialer approach.

One of these two prior art systems is the system disclosed in the patent to R. D. Huntington, Jr., et al., issued Dec. 7, 1954 and titled: "Automatic Fire and Burglar Alarm System for Telephone Subscribers", U.S. Pat. No. 2,696,524. This system uses a carrier-current method and is able to detect line trouble such as severance but, in my opinion, is easily defeated by a burglar making a simple electrical short of the telephone line to earth-ground.

The second of these two prior art patents is the patent to R. D. Avery, et al., issued Jan. 17, 1967 and titled: "Telephone Signal Reporting System", U.S. Pat. No. 3,299,211. This system seizes the line to send an event signal like an automatic-telephone-dialer does and similarly has no provision to detect line trouble.

Another patent in context, is the patent to C. A. Lovell, U.S. Pat. No. 3,484,553, issued Dec. 16, 1969, and titled: "Alarm System Connected To A Telephone Subscriber's Circuit So As To Transmit An Alarm Through the Central Office Without Interfering With Normal Telephone Operation". Similarly, this prior art system is unable to identify line trouble.

The complementary system described in co-pending application Ser. No. 360,604, filed May 15, 1973, titled: "Signal Transmission And Surveillance System Using An Operational Telephone Line" is similarly operative for assured information transmission without disrupting normal telephone service. The design of the present invention complements that of this related system with the fundamental difference between the two being the manner of telephone line modulation.

SUMMARY OF THE INVENTION

Briefly, this invention is an electronic signal transmission and surveillance system employing an operational telephone line for the purpose of relaying event signals, particularly those events constituting an alarm, in addition to the normal telephone system functions, except at times when a malfunction prevents such transmission and at such times some form of malfunction indication occurs at the receiving station.

Throughout this application the invention is designated "T-TASS", which is an acronyn for "telephone-transmission and surveillance system"; also hereinafter the word "system" or the words "new system", for the sake of brevity, both refer to this invention unless specified otherwise.

A specific objective of the invention is a more effective and efficient utilization of a telephone subscriber's line to transmit alarm information. In addition to real-time signal transmission via an operational telephone line without disrupting the normal working of the telephone system, my new system is able to continuously monitor the system's operational status and also the operational status of the telephone system which affects my system so as to detect malfunctions which make my system inoperative.

The continuous monitoring manifesting more effective utilization is a principle feature of my system which substantially compensates for the aforementioned vulnerability of most prior art systems. This new signal transmission is more efficient because the system of this invention generally causes less telephone service degradation than prior art systems.

It is another object of this invention to provide a system which is simply connected to the telephone and requires no telephone equipment adapting modifications; the latter is of considerable importance regarding telephone company acceptance.

It is still another object of this invention to provide a system that operates effectively and efficiently when the associated telephone system is in an off-hook condition.

The newness of the T-TASS system of the invention can be expressed as the unique application of the COMPENSATION THEOREM of electrical network theory in conjunction with the two basic circuitry means of the system's receiver along with ancillary techniques for the suppression of system line voltage, all subject to telephone system constraints. In theory, the "electrical characteristics" of the telephone system are recognized; subsequently, the system is conformably designed so that noninterfering signal transmission results. In contrast, the heretofore mentioned automatic-telephone-dialer system recognizes the "system characteristics" of the standard dial-telephone system and is accordingly designed to automatically perform what would otherwise be required of a human operator.

It is a further object of the invention to provide a system in which a plurality of condition responsive signals may be simultaneously transmitted over a single telephone line.

Furthermore, it is an object to provide a system in which a plurality of systems may be used with a single operational telephone line irrespective of whether the line is a single or multiple-party line.

It is a still further object of this invention to provide a system that is operative in a multitone dialing as well as a pulse dialing system.

The T-TASS system is not necessarily intended to supersede prior art systems except in cases of overall commercial advantage.

An additional object of this invention is to provide such system services at costs so low the service will be widely used.

Other objects, together with the foregoing, are attained in the preferred embodiments of the following description and in the accompanying drawings. It is intended that the drawings be illustrative of the manner in which the invention can be constructed and that the preferred embodiments not be construed as defining the limits of the invention.

BRIEF DESCRIPTION OF THE DRAWING

Apprehension of the concepts, features and details of the invention will be aided by reference to the drawings which consist of ten sheets having sixteen figures as follows.

DESCRIPTION OF THE PREFERRED EMBODIMENT

Figure 1:
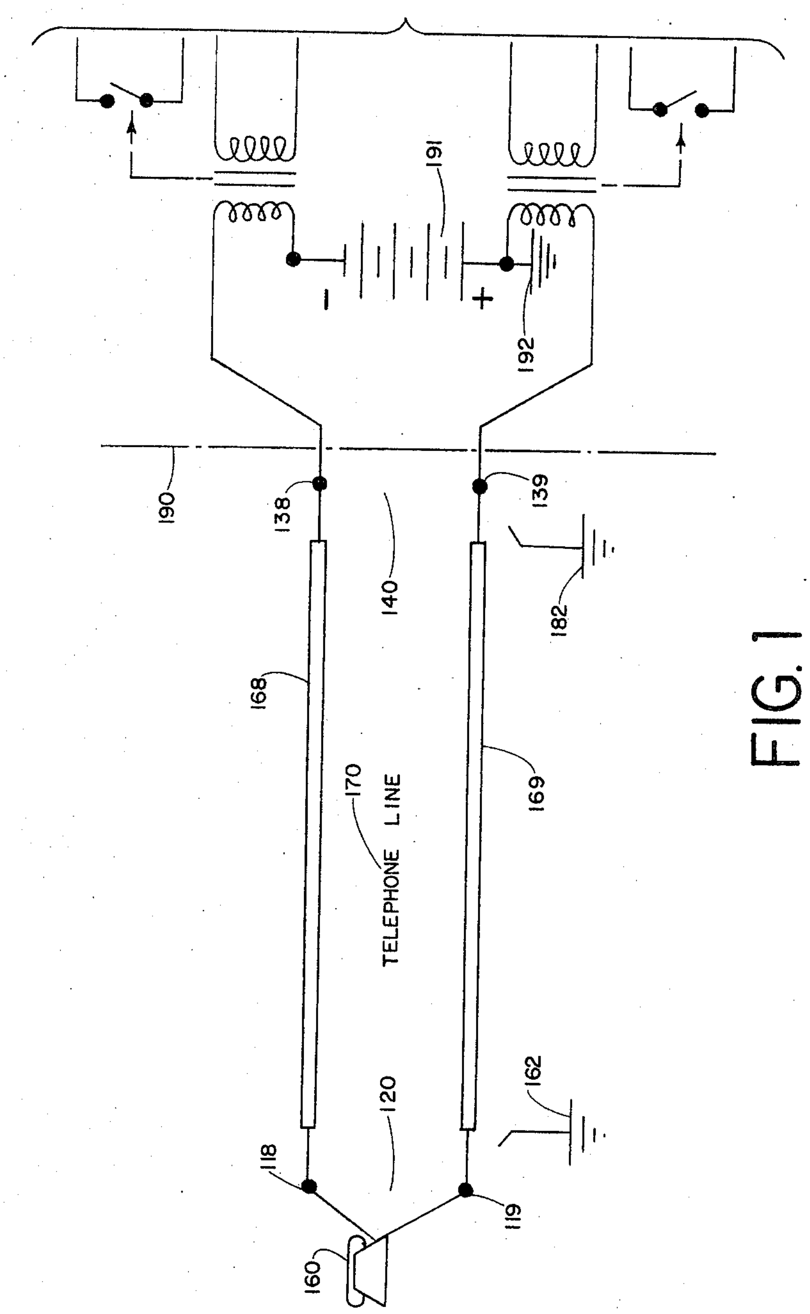
FIG. 1 is a diagram of a telephone instrument and a telephone exchange connected by a telephone line.

The generic T-TASS system consists of two separate units, namely, a first and second unit generally designated by reference numerals 200 and 300 respectively; each is bridged to the telephone line 170 of a telephone system for signal transmission from the first unit to the second unit via this line.

Referring to FIG. 1, there is shown a conventional telephone line 170 linking a telephone instrument 160 to a telephone exchange/central-office 190, together defining a telephone system. The instrument terminus of the telephone line 170 is designated by numeral 120 and the exchange terminus by numeral 140. Specifically, the telephone exchange 190 of FIG. 1 is a dial-central-office (DCO) exchange with a rudimentary schematic of the line terminating circuit shown. The DCO responds to pulse addresses of the standard 60/40 format generated by the local telephone instrument 160; also, the DCO can incorporate equipment to accept tone-pair bursts used in the TOUCH TONE dialing system of the American Telephone and Telegraph Company. The invention is capable of operating in conjunction with telephone systems using either dialing method.

The telephone line wire 168 is named an "N-wire" as it is DC coupled to the negative terminal of the DCO battery 191; the N-wire instrument terminus is designated by numeral 118, the exchange terminus by numeral 138. Similarly, the telephone line wire 169 is named a "P-wire" as it is DC coupled to the positive terminal of the DCO battery; the P-wire instrument terminus is designated by numeral 119, the exchange terminus by numeral 139. N-wire 168 and P-wire 169 are conventionally referred to as Ring and Tip, respectively. The standard telephone system DCO battery voltage is 48 VDC with the positive terminal earth-grounded 192.

The telephone system has two operational states, on-hook and off-hook. On-hook is the state where the telephone 160 is disconnected from the telephone line 170; on-hook shall be abbreviated as ONH. Off-hook is the state where the telephone is electrically connected to the telephone line; off-hook shall be abbreviated as OFH. In general, telephone system ONH (read on-hook) time exceeds the time spent in the OFH (read off-hook) state.

The normal ONH N-wire 168 DC voltage with respect to ground (162, 182, 192) is −48 volts the DCO battery 191 voltage; the ONH P-wire 169 voltage with respect to ground is zero. The OFH N-wire to ground bias voltage is typically −27 VDC with the P-wire to ground voltage typically at −21 VDC; this corresponds to an OFH telephone instrument 160 bias voltage of near 6 VDC. Should the central office 190 have line-polarity-reversing upon connection with an addressed party, the above mentioned OFH telephone line wire 168, 169 voltages with respect to ground are interchanged thereupon.

The herein operational description is with the T-TASS system of this invention linked with a standard dial-telephone system having a positive-grounded DCO battery as indicated in FIG. 1. The following disclosure, excepting polarity differences, applies equally to a dial-exchange having a negative grounded battery.

The T-TASS system sends event signals by modulating the telephone line (170) current with a first unit 200 and sensing this modulation with a matched, counter-modulating second unit 300. Application of the well-known electrical network theorem, the *COMPENSATION THEOREM* (W.L.Cassell, "Linear Electric Networks", John Wiley, Inc., 1964), in conjunction with the principles of frequency multiplexing provide the basis of the system's operation and will be referred to as the "compensation scheme". As will be shown, this method enables the system to avoid seizing the telephone line, thus excluding telephone use to a subscriber, to send event signals while furthermore doing such without degradation to normal telephone service. This together with the ancillary objects of the invention will become apparent as the following description proceeds.

The system of the invention is susceptible of multitudinous embodiments depending upon the requirements of use and the means of physical realization. The form disclosed herein is designed for assured alarm signal transmission, e.g. burglary, and represents a preferred embodiment.

Figure 2:
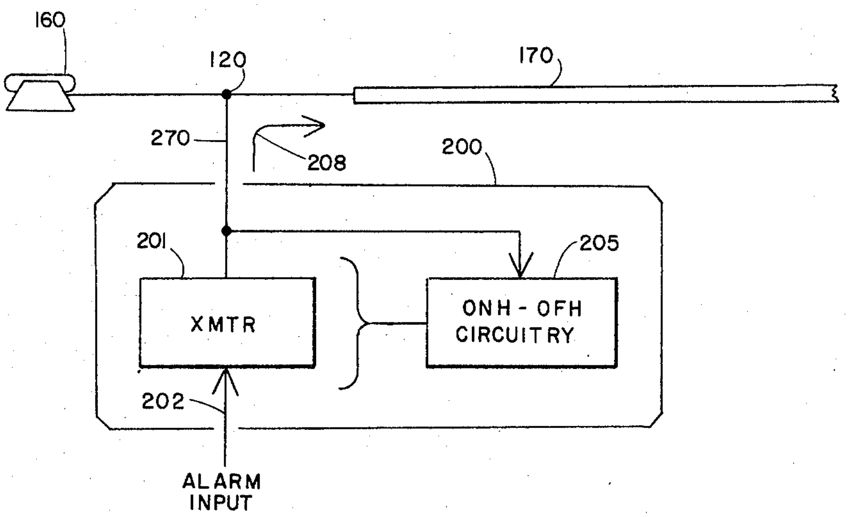
FIG. 2 is a general functional diagram of the system's first (transmitting) unit according to the invention and is shown connected to the instrument end of the FIG. 1 telephone line.

Reference is now had to FIG. 2 where the system's first unit 200 is connected to the instrument terminus 120 of the telephone line. The signal transmitting unit is shown having an alarm signal input 202 in electrical form from an appropriate sensing transducer and an output signal(modulating current)208 being delivered to telephone line 170 by interface conductor(s) 270.

Unit 200 is functionally comprised of a transmitter (xmtr) 201 which is keyed by alarm input 202. Optional ONH-OFH circuitry 205 is integrated into the first unit design should the manner of T-TASS line modulation be dependent upon the state of the telephone system.

Figure 3:
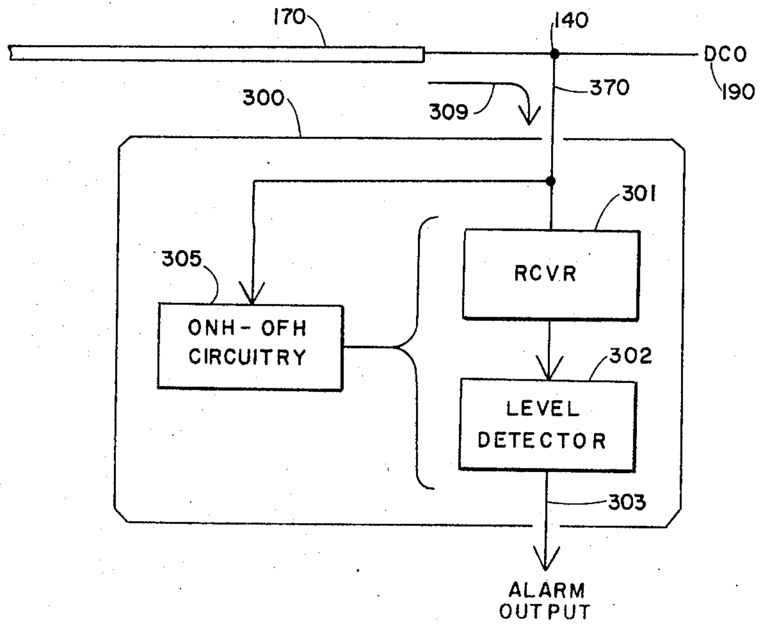
FIG. 3 is a general functional diagram of the system's second (receiving) unit according to the invention and is shown connected to the exchange end of the FIG. 1 telephone line.

The system's second unit 300 is depicted in FIG. 3 where it is connected to the exchange terminus 140 of the telephone line. The unit is shown having an input signal (counter-modulating current) 309 delivered from the telephone line 170 by interface conductor(s) 370 and an alarm output signal 303 in electrical form which is connectable to appropriate means for further transmission, encoding or/and conversion to a humanly sensible form.

Functionally, second unit 300 is comprised of a receiver (rcvr) 301 and associated level detector circuitry 302 which transforms the analog receiver output into a binary alarm/no-alarm output signal 303. Also, optional ONH-OFH circuitry 305 is integrated into the second unit design should the ways of ONH and OFH line modulation differ.

In order that the T-TASS system not hinder normal functioning of the telephone system as previously indicated, it is requisite that the system comply with the following "telephone ONH/OFH constraints":

When in the ONH state, the local telephone 160 is not in use and hence the system restrictions are few. They are: Maintaining the open-circuit telephone line termination, e.g. DC loading N-wire 168 with respect to P-wire 169 or ground (192) with a minimum of several kilo-ohms; and limiting the nominal 20 hertz line ring-signal loading (e.g. 40 milliamperes maximum) to prevent impairment of the telephone instrument's ringing apparatus.

When in the OFH state, it is essential that the system avoid using those frequencies of the several telephone signals, e.g. dial-tone, TOUCH TONE addressing, ringback and busy, and, for the most part, frequencies of the nominal 300 to 3000 hertz telephony communication band. Also, a substantially balanced line 170 bridging impedance of at least several hundred ohms at these restricted OFH frequencies is requisite. Furthermore, line bias (DC) voltage must be substantially maintained so that message transmission between the telephone instrument and exchange is not appreciably degraded.

Transmitter 201 of the system's first unit modulates the telephone line with a low-frequency current having a magnitude of up to several milliamperes; as previously indicated, numeral 208 of FIG. 2 denotes this signal current. In general, this modulating current's frequency (Fourier) composition can range from DC (0 hertz) to a nominal 30 Khz (kilo-hertz) except as indicated in the foregoing telephone ONH/OFH constraints. Receiver 301 of the second unit serves to sense this line modulating current (208); the absence/presence of such corresponding to an alarm/no-alarm condition.

In accordance with the previously introduced compensation scheme, matched receiver 301 bridges the telephone line with a one-port (i.e. two-terminal) network/circuit which is substantially zero impedance to the first unit modulating current 208. Therefore, this current is shunted through the receiving unit. This shunt current is aptly named a "counter-modulating" current as it is substantially equal to that of the modulating current but opposite in polarity; as previously indicated, numeral 309 of FIG. 3 denotes this signal current.

In FIGS. 2 and 3: reiterating, the "modulating" signal current 208 and the "counter-modulating" signal current 309 are denoted by arrows (208,209) which indicate the direction of the information signal flow.

Basic circuit/network theory reveals that the amount of current flowing through any one of a plurality of devices connected in parallel is inversely proportional to the impedance of the devices. Since the receiver 301 is designed to be of substantially zero impedance to all Fourier components (frequencies) of the modulating current 208, substantially all modulating current 208 flows through the receiver 301. And so the counter-modulating current 308 is substantially equal to modulating current 208.

As explained hereinabove, both the first unit 200 (transmitter 201) and the second unit 300 (receiver 301) are constrained to be a substantially large impedance to telephone system signal and communication frequencies.

In FIG. 1, if the direction from wire 169 to wire 168 is taken as being of positive polarity; and further, if the transmitter 201 modulates the telephone line 170 with a current (208) of positive polarity, then current flows onto wire 168 and from wire 169. From basic circuit/network theory we know current always flows in a closed loop. Line wires 168, 169 and receiver 301 comprise the rest of this current-loop. Hence, the current flow through the receiver 301 is from the wire 168 to the wire 169; this direction being negative (opposite) by earlier convention. This forms a complete explanation of why the receiver current 308 is name a counter-modulating current.

To further clarify, the telephone line 170 has actually nothing to do with the "counter-modulating current 308 being substantially equal to modulating current 208 but opposite in polarity". The transmitter 201 (first unit 200) and receiver 301 (second unit 300) just happen to be electrically connected by a line 170.

It is to be noted at this time that the receiver nullifies AC line voltage at those frequencies which it is designed to sense, i.e. deliver a counter-modulating current.

With reference to the COMPENSATION THEOREM, counter-modulating current 309 serves to compensate for modulating current 208 so that no T-TASS line (170) voltage is caused by this action except that due to the voltage product of the T-TASS line current and the impedance of the line to this current, i.e. voltage drop. This intrinsic minimization of system voltage on the line is a principal feature of the compensation scheme as it is a source of interference and intermodulation-distortion to telephone system voltage on the line — non-linear telephone 160 (carbon microphone) resistance can cause intermodulation-distortion components (M. Schwartz, "Information Transmission, Modulation and Noise", McGraw-Hill, 1959).

As will later be disclosed, three different circuit/network methods can be singly or jointly incorporated in an over-all T-TASS system design to diminish the adverse effects usually caused by the interaction of system AC line current and the impedance of this line.

In accordance with the foregoing theory, transmitting unit 200 of the system delivers a signal current 208 to line 170 thereby modulating this line in a first way; in response to this modulating current, matched receiving unit 300 ideally delivers an equal and opposite, i.e. counter-modulating, signal current 309 to this line thereby modulating the line in a second way. It is obvious that counter-modulating current 309 is the way in which the system's second unit senses modulating current 208. It is easily deduced that this carrier-current action relays alarm information (202) from first unit 200 to second unit 300.

The systems surveillance feature is realized by using a non-zero modulating current (208) to transmit a no-alarm condition from the first unit location, i.e. at least when an ONH condition prevails. Since the counter-modulating current (309) is affected by a telephone system malfunction such as line severance, it thereby also serves as an "operational status" indicator.

Figure 4:
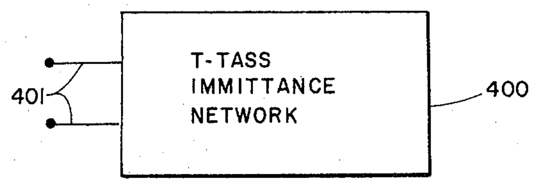
FIG. 4 is a one-port depiction of an immittance network which is one of the two basic circuits of the second unit's receiver.

Two well-known circuits comprise the invention's receiver 301. They are the "immittance-filter" network and the "shunt-attenuating-amplifier" circuit. Both, of course, are one-port circuits of which at least one terminal is connected to the telephone line wires (168, 169). Numeral 400 in FIG. 4 indicates a one-port representation of the immittance-filter while numeral 500 in FIG. 5 denotes a general shunt-attenuating-amplifier block diagram; the ports are designated by numerals 401 and 501, respectively.

In general, the invention's immittance-filter 400 is an immittance network which bridges the telephone line with a low input-impedance (high admittance) at T-TASS signal (208) frequencies and a large input-impedance (low admittance) at telephone system frequencies as previously indicated. The design of frequency dependent immittance functions is old in the art with voluminous design procedures available in the technical literature. "Electric Networks: Functions, Filters, Analysis", McGraw-Hill, 1966 by H. Ruston & J. Bordogna, includes a treatment of one-port network synthesis.

Figure 5:
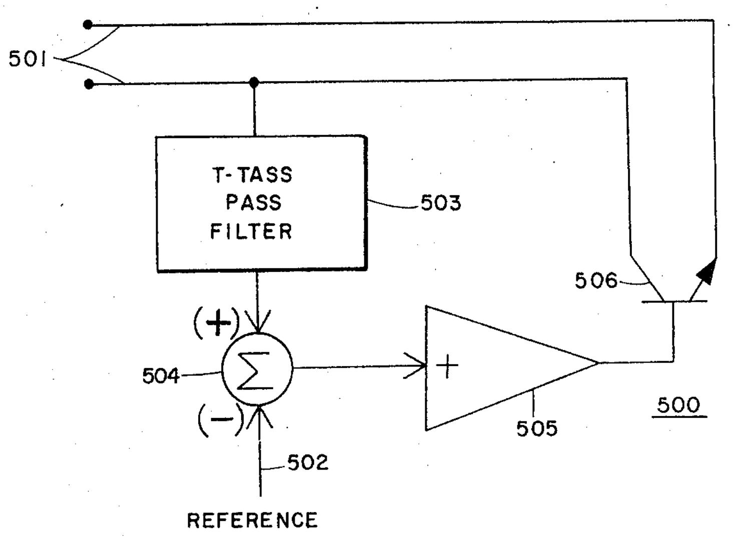
FIG. 5 is a functional depiction of the shunt-attenuating-amplifier circuit, the other basic circuit of the second units receiver.

Reference is now had to FIG. 5 which illustrates the shunt-attenuating-amplifier circuit. This circuit is actually the basic feedback (closed-loop) circuit of the well-known "shunt regulator" type of DC power supply; the name "shunt-attenuating-amplifier" being given as it is descriptive of the circuit's function in the T-TASS receiver. In the model 500: component 504 is a difference summer whose output is equal to the T-TASS pass filter 503 output minus reference signal 502 and is delivered to transistor 506 through noninverting, high gain amplifier 505. It is to be noted that the transistor's output (collector) is also the input to T-TASS filter 503 which substantially passes that component of sensed line (170) voltage caused by modulating current 208 while substantially blocking telephone system voltage.

If the feedback loop is arbitrarily broken at the input to amplifier 505, the gain (amplification factor) from the amplifier input to the output of difference summer 504 is conventionally defined as the "loop-gain"; similarly, the corresponding phase shift is conventionally defined as the "loop-phase shift". This negative feedback circuit has the following pertinent characteristic: the resultant signal at 501 is substantially equal to the superposition (sum) of reference signal 502 and the signal applied to 501 after it is transformed by the reciprocal of the circuit's loop-gain provided the circuit is stable, i.e. does not oscillate; stability requires loop-phase shifts not be an integral multiple of 360 degrees when the loop-gain is equal to or greater than unity for all frequencies. "Control System Design", McGraw-Hill, 1964 by C. J. Savant, extensively examines this well known property.

Summer 504 and amplifier 505 are typically realized in a differential amplifier circuit. Furthermore, T-TASS pass filter 503 is commonly combined with a high input-impedance, high gain, differential amplifier thereby jointly realizing summer 502, filter 503 and amplifier 505. The design of such circuitry is well known in the technology of electronics and adequate descriptions are available in the technical literature, e.g. H. P. Huelsman, "Active RC Networks", Burr-Brown Research Corporation, U.S.A., 1966.

In general, the open-loop nature of the immittance-filter enables it to realize sharper frequency selectivity characteristics than those of its counterpart; this is because instability, i.e. self-generated oscillations, does not plague the immittance-filter as it does the shunt-attenuating-amplifier circuit. As pertains essentially to the OFH state, shunt-attenuating-amplifier circuit stability is maintained by (1) judiciously restricting the amplitude and Fourier composition of the transmitter modulating current 208 and (2) a judicious choice of loop-frequency response characteristics or some combination thereof. It is to be understood that in the practice of this invention it is a specific over-all design consideration as to what telephone system performance degradation is considered tolerable.

Whereas the passive, non-feedback (open-loop) immittance-filter 400 is limited to realizing AC components of the counter-modulating current (309), the active/passive shunt-attenuating-amplifier 500 can realize both AC and DC counter-modulating current components. For the sake of clarity, the classifications of active/passive (i.e. source/load) pertain to the port (401,501) electrical characteristics. In accordance with what has been heretofore described, it follows that the matched receiver (301) necessarily be passive if its counterpart circuitry in transmitter 201 is active and vice-versa.

Attention now focuses on a realization of the preferred embodiment of FIGS. 2 and 3. The schematic-diagrams of FIGS. 6 and 7 (including 7A, 7B and 7C) are respective implementations of first unit 200 and second unit 300. This system operates in accordance with the foregoing disclosure by modulating the line (170) with a nominal 7 milliampere DC current during an ONH state and a nominal 2 milliampere, 4 Khz sinusoid current during an OFH state. Assured alarm signal sending is realized by having the presence of the modulating current (i.e. DC or 4Khz) on the line correspond to a no-alarm condition in each state; absence of the system line modulating current at the second unit thus manifesting an alarm condition.

Although the circuits of FIGS. 6 through 12 are arranged for illustration, they, for the most part, provide complete constructural information. The sub-circuits of which represent ordinary circuit designs; however, this is not to imply that component electronics for the invention couldn't be realized at some future date which in itself would be considered a patentable invention.

Figure 6:
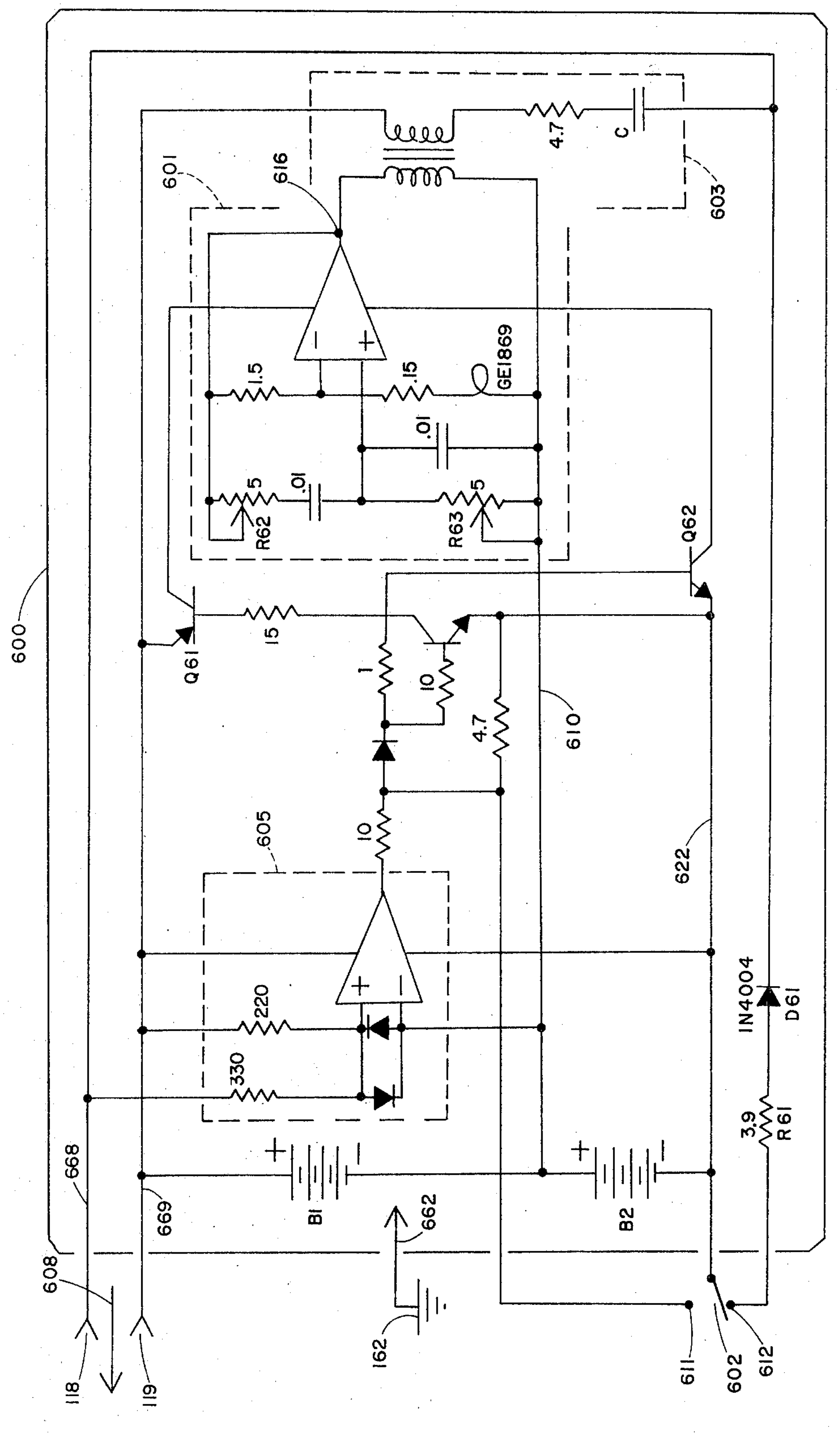
FIG. 6 is a schematic diagram suitable for serving as the first unit of FIG. 2.

Referring to FIG. 6, implemented first unit 200 is indicated by numeral 600. Alarm transducer output single-throw double-pole (SPDT) switch 602 corresponds to alarm input 202, telephone line connecting conductors 668,669 embody 270 with numeral 608 indicating the alarm signal flow of modulating current 208. FIG. 6 shows alarm input switch 602 in the no-alarm position 612; conversely, position 611 corresponds to an alarm condition. Conductors 668 and 669 link unit 600 to telephone line N-wire 168 and P-wire 169 respectively.

Diode D61 and line state detector 605 comprise the ONH-OFH circuitry (205) of transmitting unit 600. As appears most clearly in FIG. 6, ONH-OFH detector 605 is comprised of a saturating differential input operational amplifier having inputs from resistive voltage divider R68,R69 which bridges line 170 (668, 669), and reference voltage 610, the circuit common; the diode pair serves to shield the operational amplifier from high line voltage, e.g. ring-signal and high transcients due to and lightning. The detector 605 operational amplifier is biased with batteries B1 and B2.

It is to be noted at this time that an ONH-OFH detector (605) design having only a single N-wire or P-wire input connection is entirely feasible. For example: When in the ONH state, N-wire 168 voltage more negative than a median threshold voltage of −35 VDC with respect to ground prevails; a more positive N-wire voltage exists in the OFH state. Similarly, P-wire 151 voltage is more positive than a median threshold voltage of −10 VDC with respect to ground in the ONH state; conversely, a more negative P-wire voltage prevails for the OFH state. However, in general, better performance and efficiency of design is realized when both telephone line 170 wires are available.

Resistor R61 comprises the transmitter (201) ONH part. When an ONH condition prevails, the ONH line voltage forward biases diode D61 provided an alarm condition does not exist (612); resistor R61 sinks (loads) a nominal 7 milliampere DC current from the line through batteries B1 and B2 thereby maintaining them in a charged condition. This DC current ceases upon an alarm input (611) or an OFH state which has diode D61 reverse biased.

The transmitter (201) OFH part is comprised of a Wein Bridge Oscillator 601; the circuit's frequency of oscillation is 4Khz with R62 and R63 adjusted to 4 kilo-ohms. This circuit is recognized for its high purity sine wave generation and can be implemented in any of many well-known ways.

When an OFH condition prevails, switching transistors Q61 and Q62 are saturated via the positive (near +B1 volts) line state detector output; this applies bias (669, 622) to the oscillator's operational amplifier thereby energizing it. The oscillator delivers (sources) a nominal 2 milliampere current to the line (170) through transformer output network 603.

Upon an ONH condition, oscillator 601 is deenergized as the negative (near-B2 volts) ONH-OFH detector output cuts-off Q61 and Q62; an alarm input (611) similarly deenergizes oscillator 601.

Figure 7:
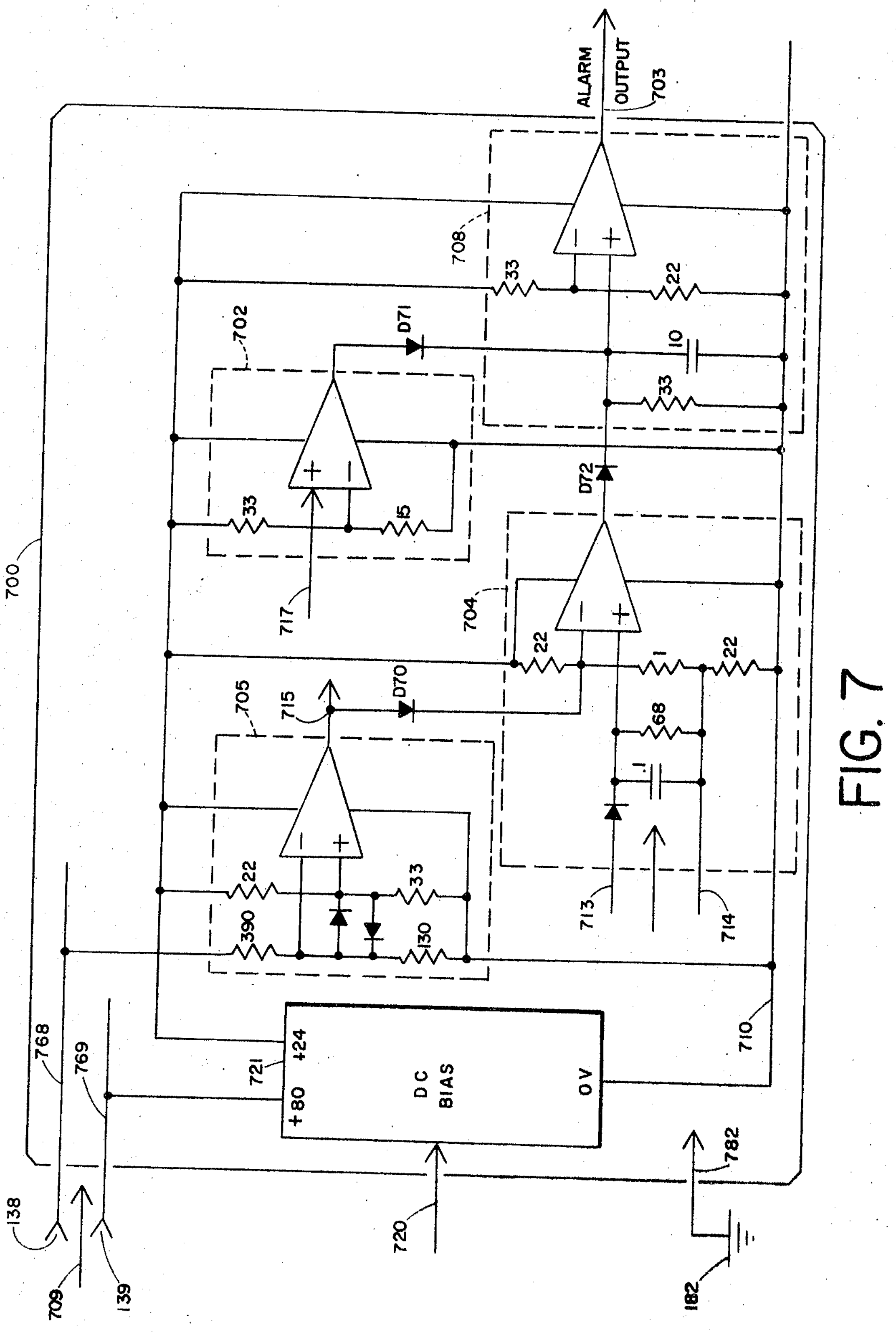
FIG. 7 is a schematic diagram suitable for serving as the second unit (less receiver) of FIG. 3.

Reference is now had to FIG. 7. Implemented second unit 300 less receiver (301) ONH and OFH parts is indicated by numeral 700. The receiver ONH part is designated by numeral 731 in FIG. 7A and the OFH part by 751 in FIG. 7B. Telephone line connecting conductors 768, 769 embody 370 with numeral 709 indicating the alarm signal flow of counter-modulating current 309. Conductors 768 and 769 link unit 700 to telephone N-wire 168 and P-wire 169, respectively. Output 703 corresponds to alarm output 303.

As appears most clearly in FIG. 7, an interposing source of 80 VDC is shown in series with the circuitry of receiving unit 700. Power supply 721 realizes the two regulated DC voltages required by the unit's circuitry, i.e. +24 and +80 VDC; the circuit common is denoted by numeral 710. In general, electrical power input 720 is 115VAC, 50/60 Hz. The power supply is a standard item of electronic systems and therefore need not be discussed in detail herein. As will subsequently be described, the interposing 80VDC source serves to make ONH receiver 731 a controlled source of DC counter-modulating current.

Line state detector 705 comprises the ONH-OFH circuitry (305) of the system's receiving unit; the design for all practical purposes being the same as that of the heretofore described first unit ONH-OFH detector 605. Detector output 715 is high (near 24 volts) during an ONH state and low (near 0 volts) when an OFH condition prevails.

Figure 7A:
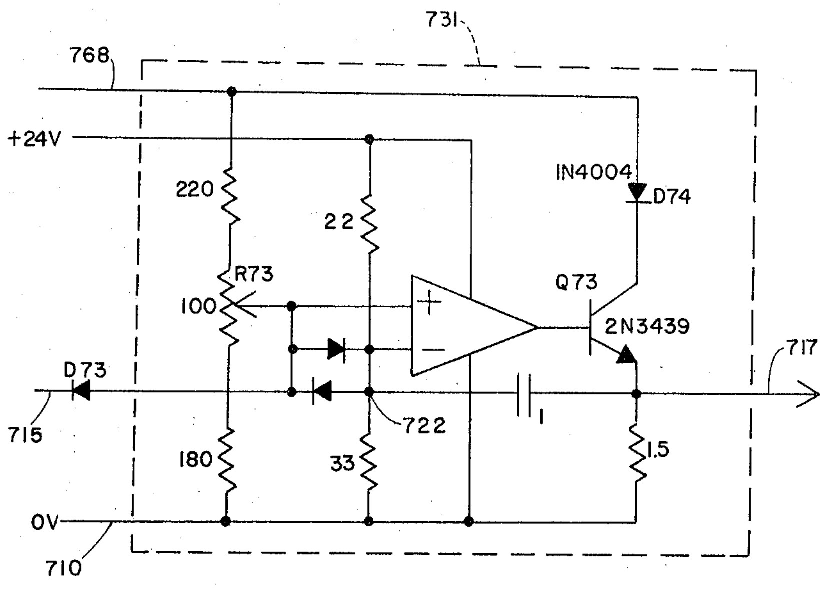
FIG. 7A is a schematic diagram of the ONH receiver of FIG. 7 matched to the transmitter ONH part of FIG. 6.

Focusing on FIG. 7A, it is shown that a shunt-attenuating-amplifier circuit comprises the receiver's ONH part. In order to maintain the normal ONH DC line voltage, circuit 731 serves to deliver a nominal 7 milliampere DC current (counter-modulating) to line 170 in response to such from transmitting unit 600; the otherwise circuit output 717 of 0 volts is then near 11 volts.

The differential amplifier's reference input 722 (502) is realized with resistive voltage divider R724, R725. A measure of line voltage 768 (501) is delivered to the noninverting amplifier input via potentiometer R722; with R722 properly adjusted, N-wire 168 is maintained at −48 VDC with respect to ground 182 (DCO battery 191 voltage). The diode pair shields the operational amplifier from the heretofore indicated high line voltage; protective diode D74 serves to isolate the differential amplifier and high voltage transistor Q73 should conductor 768 become too negative. Capacitor C73 ensures circuit stability while diode D73 which is reverse-biased during the ONH state, is forward biased upon an OFH condition thereby turning-off Q73.

It is to be noted at this time that a simple open-loop circuit such as an adjustable resistor (between 710 & 768) could replace closed-loop circuit 731. However, such an open-loop circuit is insensitive to variations in telephone system parameters.

Figure 7B:
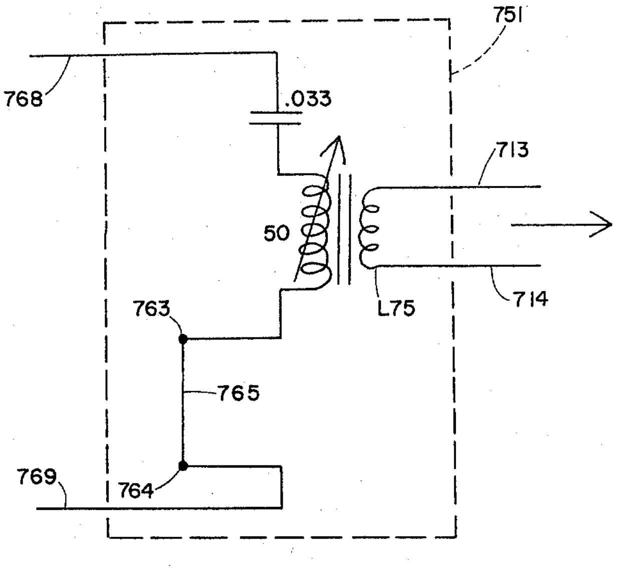
FIG. 7B is as schematic diagram of the OFH receiver of FIG. 7 matched to the transmitter OFH part of FIG. 6.

Now focusing on FIG. 7B, immittance-filter 751, the system's OFH receiver, is shown to be a simple series resonant circuit C75, L75; this series circuit is of course tuned to 4 Khz, the frequency of the sinusoidal OFH modulating current. Secondary winding W75 (713, 714) is designed to provide a sinusoidal voltage on the order of a volt whenever a few milliamperes of current are shunted through the resonant circuit.

In accordance with the foregoing disclosure, it is clearly recognized that single line wire modulation using a ground return is also a feasible way of signal transmission, e.g. N-wire 168 and earth ground.

Returning to FIG. 7, the output of OFH receiver 751 is coupled to OFH level detector 704 (302). Circuit 704 is comprised of a simple peak-rectifier circuit followed by a differential amplifier. During an OFH state, the bilevel amplifier output is high when voltage of the proper polarity is delivered to it, i.e. when the peak-rectifier output nears a volt; otherwise, the output is low. Diode D70 becomes forward biased upon an ONH condition thereby having a low output from circuit 704.

Output 717 of ONH receiver 731 is coupled to ONH level detector 702 (302). Subject to input 717 being greater than a nominal 8 volts, the saturating differential amplifier of threshold circuit 702 provides an output which is high; conversely, a lesser input voltage results in an output which is low.

Diodes D71 and D72 realize a logic "OR gate" combining ONH and OFH level detector (702,704) outputs; this OR gate is followed by output circuit 708. In accordance with the foregoing analysis, it follows that a high output 703 represents the absence of an alarm (612); conversely, a low output represents an alarm (611) transmission. The capacitive-holding-circuit of output stage 708 serves to preclude momentary false alarms.

Figure 7C:
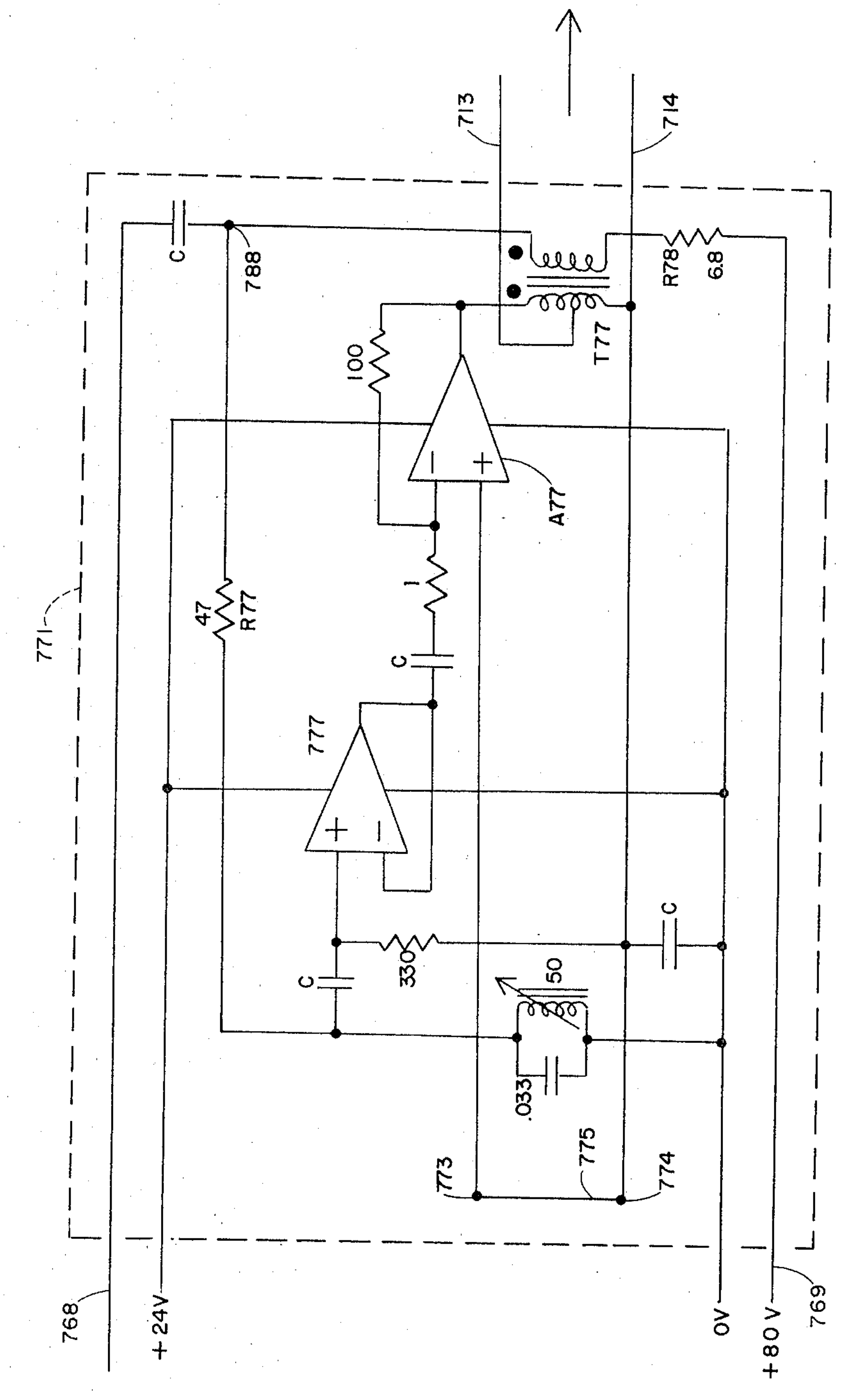
FIG. 7C is the schematic diagram of an alternate circuit suitable for serving as the matched OFH receiver of FIG. 7.

Another OFH receiver embodiment 771 comprising a shunt-attenuating-amplifier circuit is shown in FIG. 7C. This circuit delivers a counter-modulating current measure (713) to OFH level detector 704 like immittance-filter 751.

The counter-modulating current measure 713 is a quantity, in this case an AC voltage signal at 713, which is related to the counter-modulating current flowing between receiver 771 leads 768 and 769 in FIG. 7C. The relationship or functional dependency in this case being a constant scale factor determined by the tap position on the primary of the transformer T77. It is to be noted that the receiver 771 leads 768,769 are connected to the telephone line wires 168,169 via second unit terminals 138,139 (FIG.7), respectively. As will be understood, circuit 771 is well-illustrated by comparing parts thereof to corresponding parts of the shunt-attenuating-amplifier model 500; the following corresponding figure identifications relate to the description: Output/input 788 (768) and virtual ground 773, respectively, correspond to port 501 and reference 502. Resistor R771 and the parallel tank-circuit C77, L77

(4Khz resonance) comprise T-TASS pass filter 503; voltage-follower 777 serves as a buffer to maintain a high tank-circuit Q. Difference summer 504 and high gain amplifier 505 in this case are realized by gain-stabilized operational amplifier A77. Transformer T77 and resistor R775 provide the interface stage (506). This circuit's 4 Khz loop-gain approaches 40 db (decibels); therefore, the otherwise line voltage at 4 Khz is attenuated by this factor.

As previously indicated, three different methods are available to nullify the presence of system AC line voltage; this voltage is troublesome during an OFH state. The three methods are the (1) symmetrical method, (2) interposing filter method, and (3) shifting method and are respectively covered in the following paragraphs.

It is to be noted now that the manner in which transmitting unit 600 modulates telephone line 170 has T-TASS current on N-wire 168 and P-wire 169 to have opposite polarities; therefore, system line voltage generated by each wire is additive, i.e. between the two wires. The symmetrical method nullifies line voltage due to system line current by realizing in-phase N-wire and P-wire modulating currents; system voltage generated by each wire is then of the same polarity and hence negates one another.

Figure 8A:
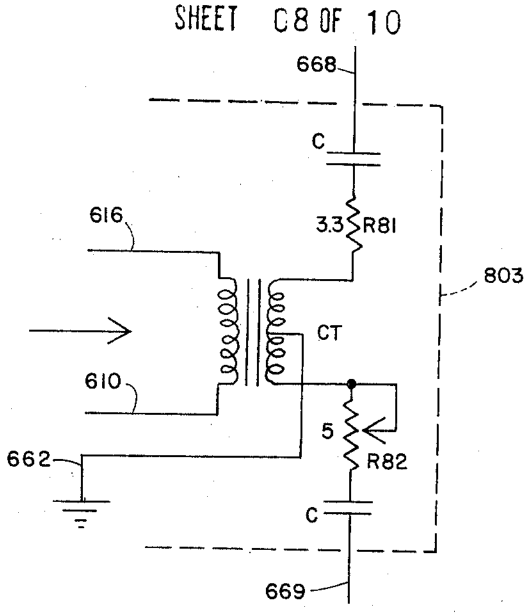
FIG. 8A is a schematic diagram of a network which can be used to convert the transmitter OFH part of FIG. 6 to a symmetrical transmitter.

Reference is now had to FIG. 8A. As applied to transmitting unit 600, the symmetrical method involves dualizing transformer output network 603; the symmetrical counterpart being denoted by numeral 803. As is clearly shown in circuit 803, transmitter output 616 is delivered through a balanced transformer thereby realizing in-phase N-wire and P-wire modulating currents; the current amplitudes are equalized by adjusting R82 to substantially equal R81. The transformer center-tap (CT) is earth-grounded 662 (162); ground return current is equal to the sum of the two T-TASS wire currents and having an opposite polarity.

Figure 8B:
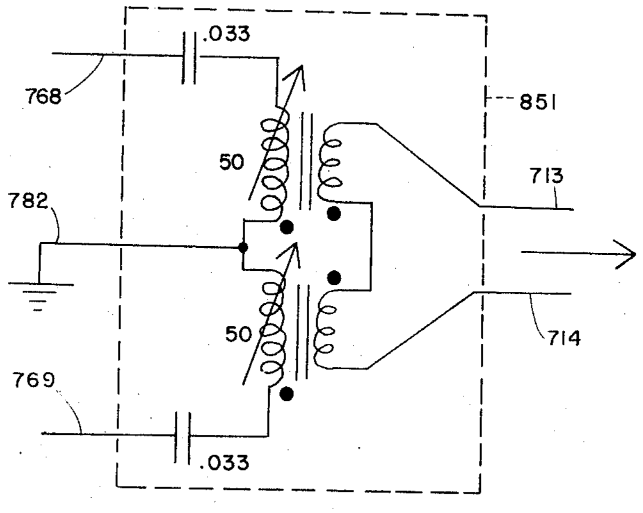
FIG. 8B is a schematic diagram of the symmetrical counterpart of the OFH receiver of FIG. 7B.

Referring to FIG. 8B, balanced receiver 851 diagrams the symmetrical counterpart of OFH immittance-filter 751.

The interposing filter method nullifies line voltage due to system line current by isolating this voltage from a telephone station; "station," by definition being the telephone instrument (160) or the telephone exchange (190). This isolation is accomplished by interrupting the line between a station and the line bridging connection of the closer unit with an interposing T-TASS stop filter. By specification, this filter substantially blocks T-TASS voltage while bilaterally passing substantial telephone system voltage. Such filters are commonly included under the classification of "two-port networks"; the design of frequency selective two-port networks is old in the art and is also covered in the heretofore mentioned "Electric Networks: Functions, Filters, Analysis".

Figure 9:
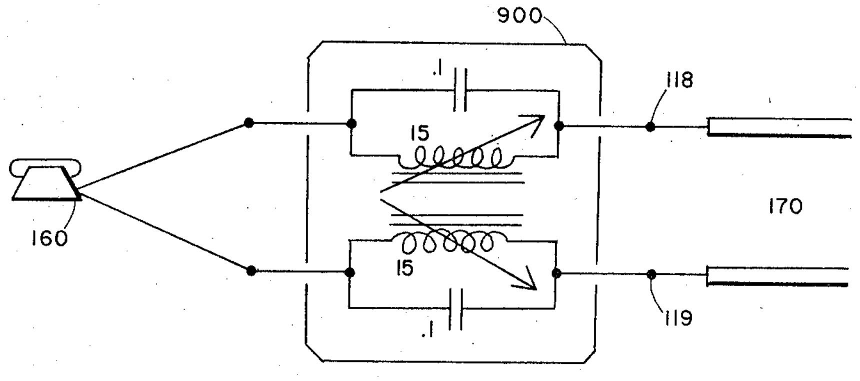
FIG. 9 illustrates a T-TASS stop filter interposing between the first unit line connection (FIG. 2) and the line terminating telephone.

Reference is now had to FIG. 9. As applied to the preferred embodiment, balanced two-port network 900 serves to isolate OFH T-TASS voltage from telephone instrument 160. The parallel tank-circuits are of course tuned to resonate at 4 Khz.

The third method of nullifying line voltage due to system AC line current is the shifting method. This method serves to transpose system line voltage from transmitting unit (200) to receiving unit (300).

As has been noted, the preferred embodiment of this invention has N-wire and P-wire system currents to have opposite polarities: thus, system voltage generated by each wire is of opposite polarity and hence additive. In accordance with the foregoing disclosure, T-TASS line voltage is largest at the first unit location (120). The shifting method is particularly useful when T-TASS signal transmission is toward the exchange, and T-TASS frequencies are outside the nominal telephony frequency band of 300 to 3000 hertz (600, 700). The reason is twofold: reduced T-TASS line voltage at the telephone instrument, and out-of-band DCO attenuation precludes further T-TASS signal propagation, i.e. to a connecting subscriber.

The shifting method involves incorporating a source of negating T-TASS voltage into the system's receiver (301). This line negating voltage is aptly named a "shifting-voltage" as, observably, it shifts first unit T-TASS line voltage (120) to the second unit location (140) thereby reducing T-TASS line voltage at the first location. The source of negating T-TASS voltage or shifting-voltage being at least partially equal to the product of the system AC line current and the line impedance to this current.

Three circuit techniques can be singly or jointly incorporated in an over-all receiver design to realize the described shifting-voltage. They are the (1) reference technique, (2) insertion technique, and (3) negative impedance technique. An implementation of each to reduce T-TASS OFH voltage (4 Khz) at telephone instrument 160 is respectively diagrammed in FIGS. 10, 11 and 12.

Unlike the insertion and negative impedance techniques, the reference technique is useable only with the shunt-attenuating-amplifier circuit. The reference technique involves superimposing a properly phased voltage proportional to the system AC line current-line impedance product onto the reference input (502, 773) of the receiver's shunt-attentuating-amplifier shunt-attenuating-amplifier In accordance with what has been described, the shunt-attenuating-amplifier output (501, 788) is accordingly modified by substantially this reference variation thereby realizing the shifting voltage.

Figure 10:
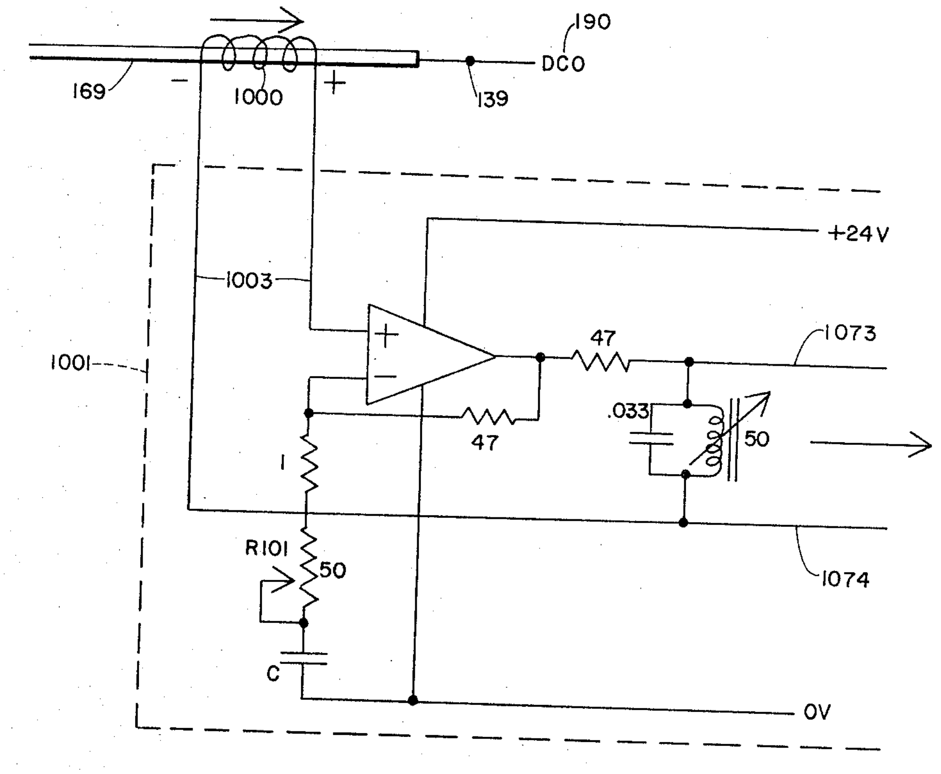
FIG. 10 is a schematic diagram of a circuit for delivering a voltage proportional to the system AC line current to the shunt-attenuating-amplifer receiver of FIG. 7C.

Referring to FIG. 10, amplifier 1001 serves to superimpose an AC voltage (1073) onto reference input 773 of shunt-attenuating-amplifier circuit 771 (FIG. 7C). This voltage is delivered by respectively connecting conductors 1073 and 1074 of amplifier 1001 to nodes 773 and 774 of this OFH receiver; shorting conductor 775 is accordingly removed.

Inductive device (current transformer) T100 disposed at P-wire terminus 139 delivers a voltage measure 1003 of the system AC line current to amplifier 1001. The 4 Khz tuned amplifier transforms line current measure 1003 to at least substantially equal the system OFH line current-impedance product (1073). Resistor R101 provides voltage amplifier 1001 with a 30 db variable gain for adjusting to lines of different impedance, e.g. length.

The insertion technique involves disposing a properly phased voltage source in series with the system receiver; the voltage of which is proportional to the system AC line current-line impedance product.

Figure 11:
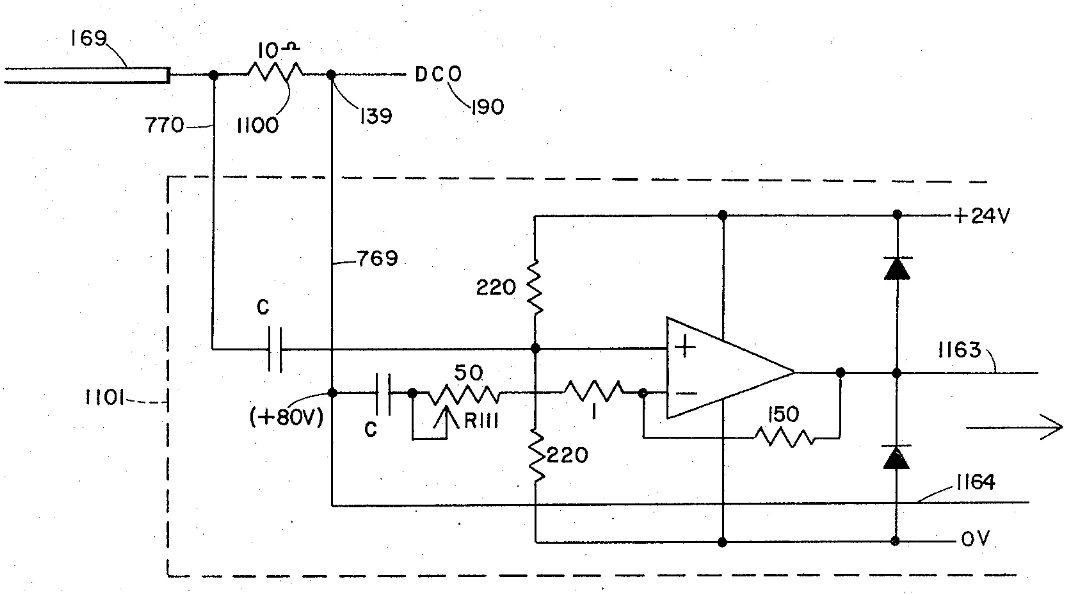
FIG. 11 is a schematic diagram of a circuit for disposing a source of voltage proportional to the system AC line current in series with the immitance-network receiver of FIG. 7B.

Referring to FIG. 11, amplifier, 1101 serves to insert an AC voltage in series with OFH receiver 751 (FIG. 7B). This voltage is delivered by respectively connecting conductors 1163 and 1164 of amplifier 1101 to nodes 763 and 764 of this immittance-filter; shorting conductor 765 is accordingly removed.

Resistor R110 interposing P-wire 169 at the exchange terminus delivers a voltage measure of the system line current to amplifier 1101 via conductor 770; it is noted that conductor 769 is a virtual ground in second unit 700. Voltage amplifier 1101 transforms the line current measure (770) to at least substantially equal the system line current-line impedance product (1163); since receiver 751 is a series resonant circuit, it serves to substantially preclude voltage other than that component at 4 Khz from the telephone line. Resistor R111 provides amplifier 1101 with a 30 db gain variation for adjusting to telephone line impedance differences; the reverse-biased diodes D111, D112 serve to protect the operational amplifier from possible high voltage surges on telephone line 170.

The negative impedance technique realizes the negating shifting-voltage by disposing a negative impedance in series with the second unit's receiver; the impedance value being at least substantially equal to the impedance transversed by the system AC line current.

Figure 12:
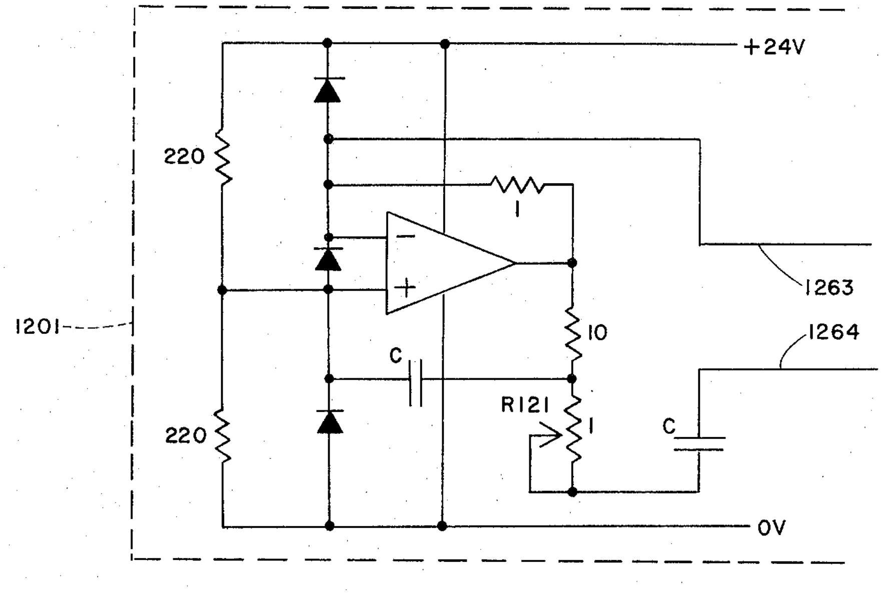
FIG. 12 is a schematic diagram of a circuit for disposing a negative resistance in series with the immittance-network receiver of FIG. 7B.
Figure 6:
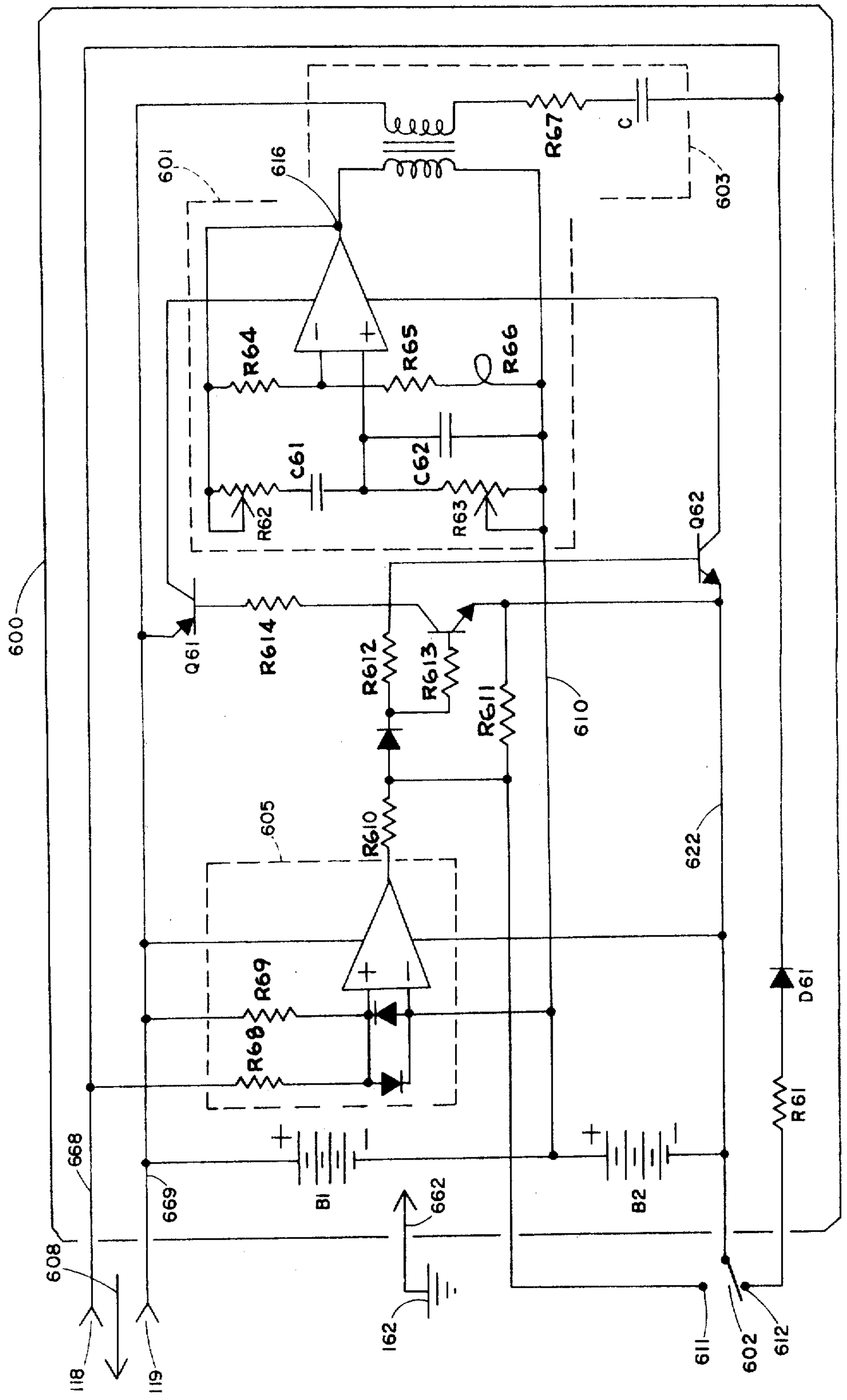
Figure 7:
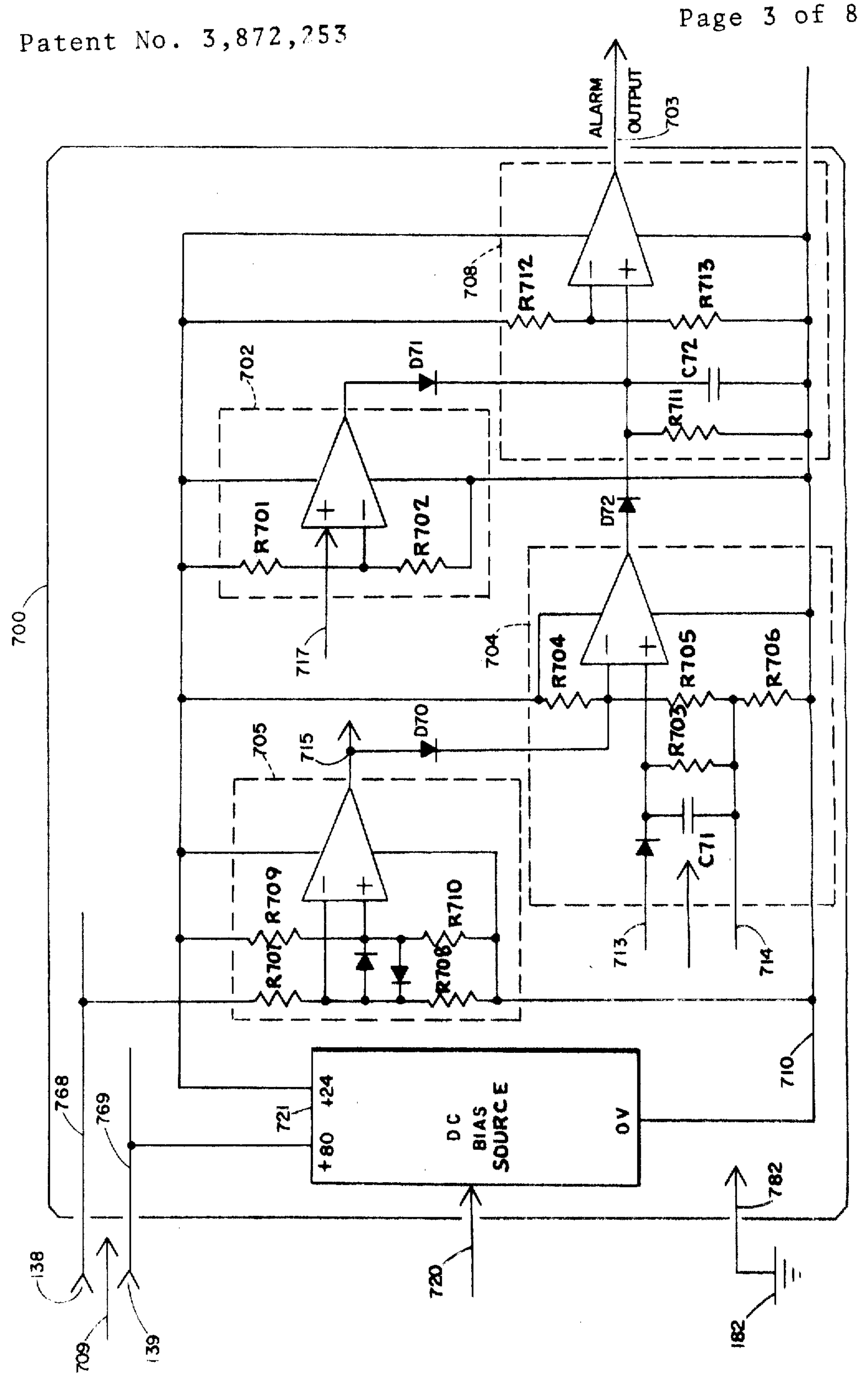
Figure 7A:
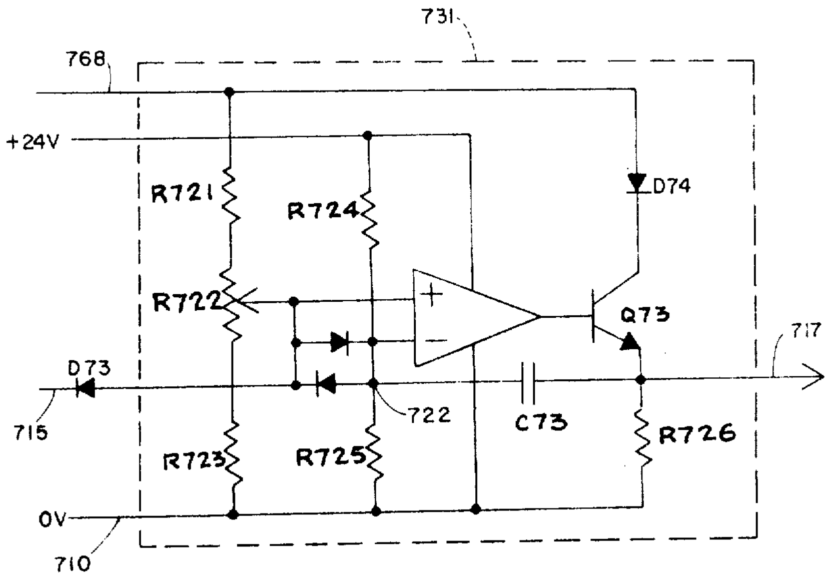
Figure 7B:
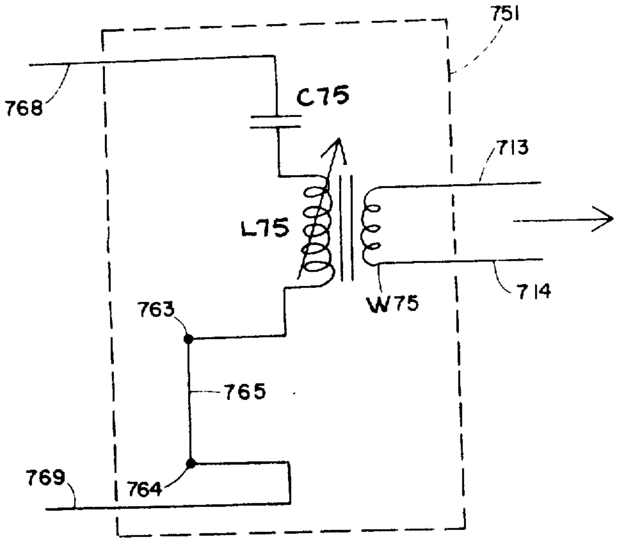
Figure 7C:
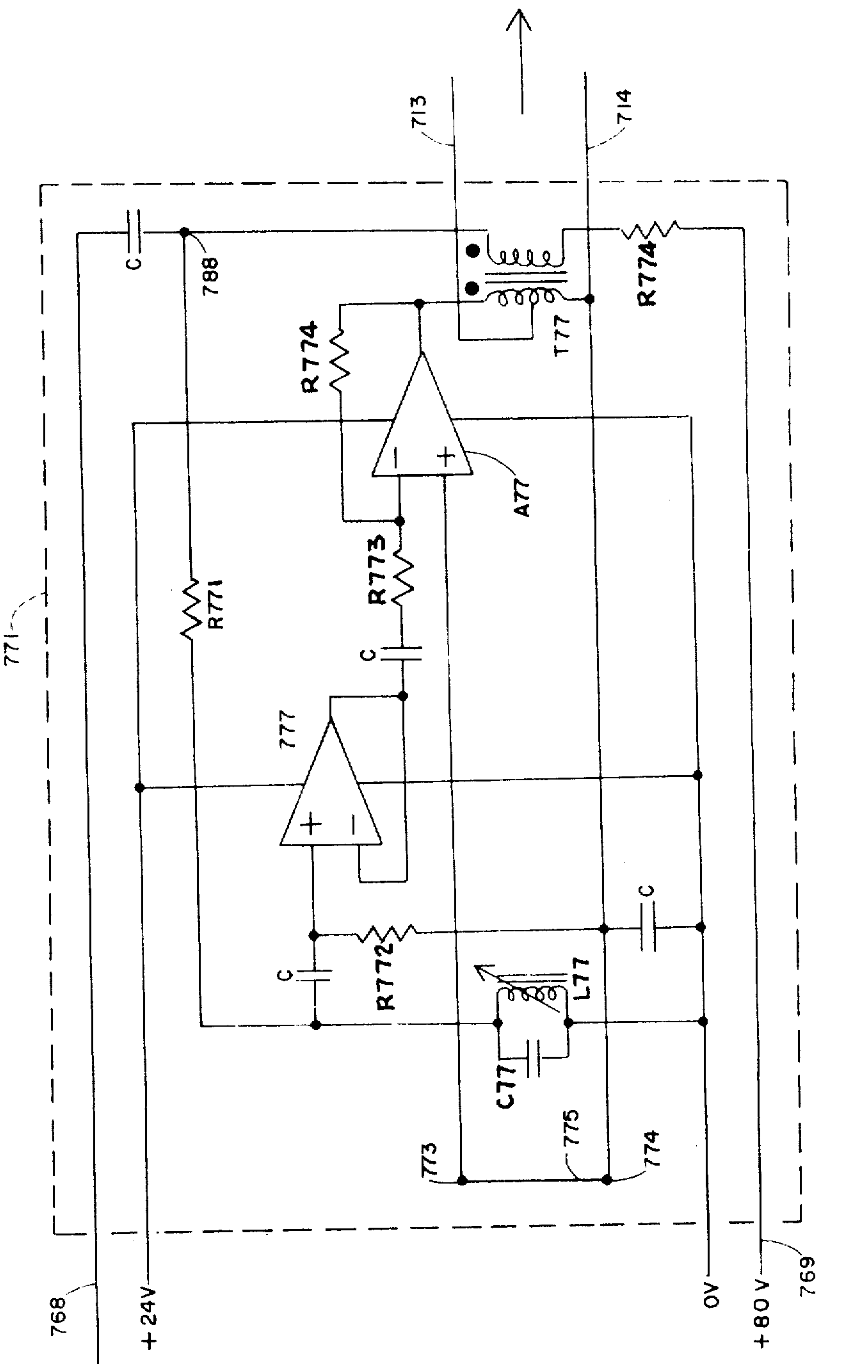
Figure 8A:
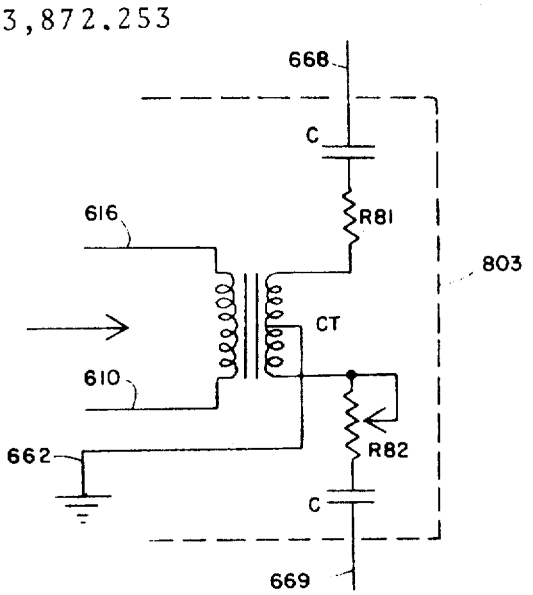
Figure 8B:
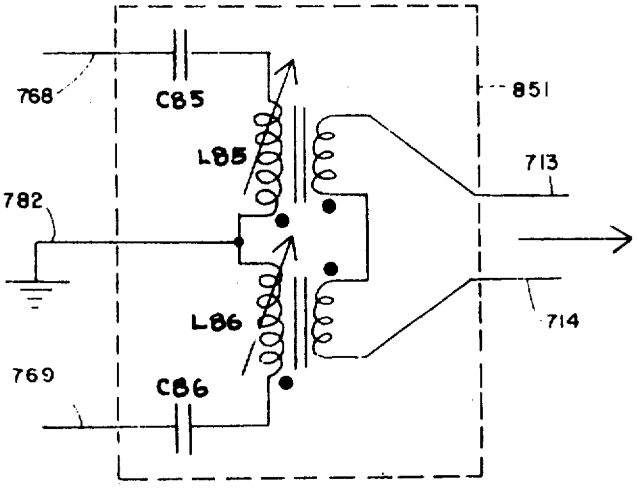
Figure 9:
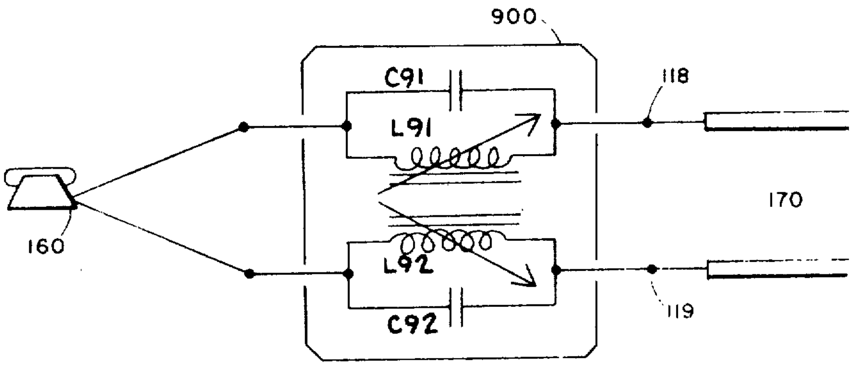
Figure 10:
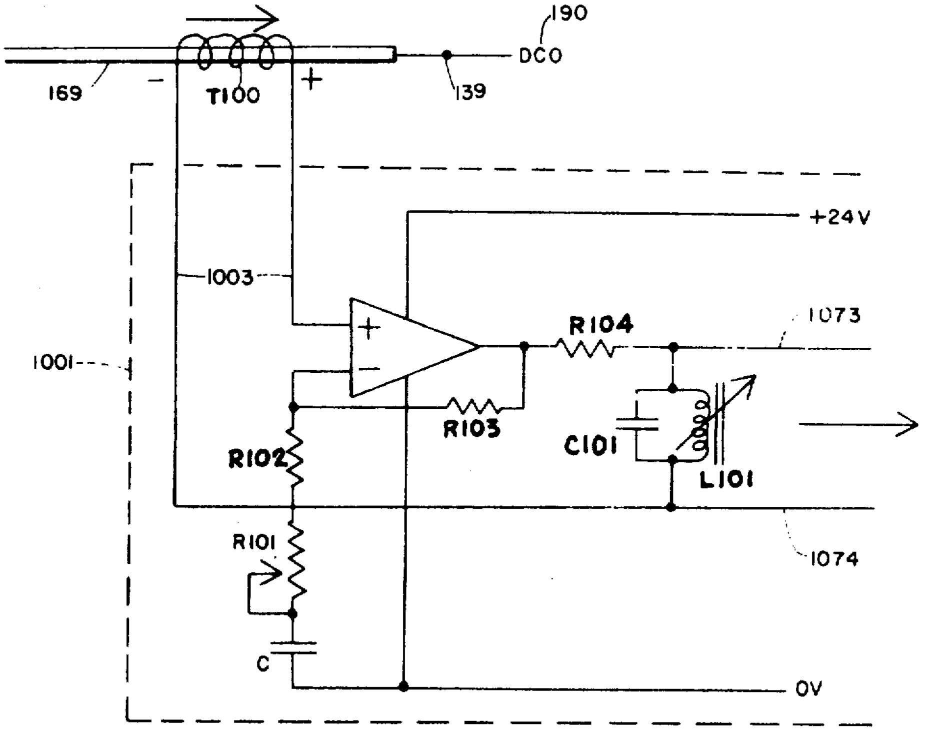
Figure 11:
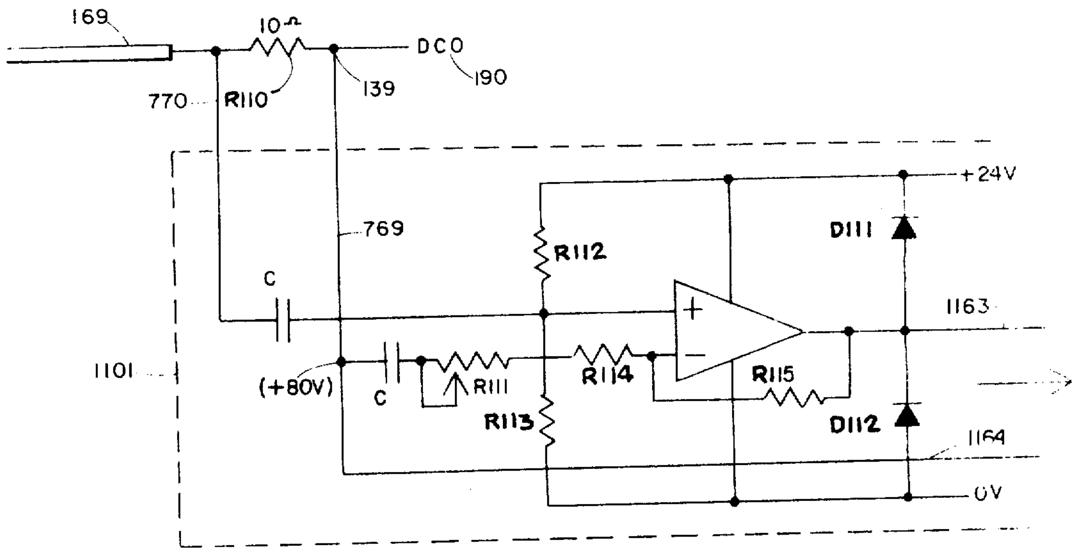
Figure 12:
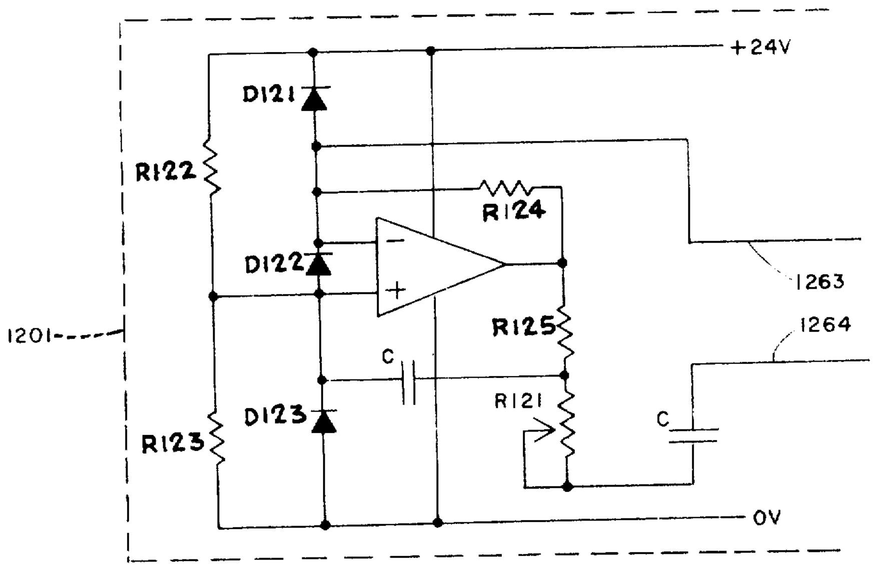

Reference is now had to FIG. 12 which diagrams a suitable negative-immittance converter (NIC) designated by numeral 1201. Basically, the NIC is a two-port device which has the property that the impedance seen at either of its ports is the negative of the impedance connected to the other port. Converter 1201 realizes a resistance which is minus one-tenth of the ohmage of resistor R121, i.e. adjustable up to a negative 100 ohms for adapting to telephone lines of different impedance. This negative resistance is disposed in series with OFH receiver 751 (FIG. 7B) by respectively connecting conductors 1263 and 1264 of converter 1201 to nodes 763 and 764 of this immittance-filter; shorting conductor 765 is accordingly removed.

The NIC of FIG. 12 is examined in detail by T. Yanagisawa, "RC Active Networks Using Current Inversion Type Impedance Converters," IRE Transactions on Circuit Theory, Vol. CT-4, No. 3, PP. 140–144, September 1957. The reverse-biased diodes D121, D122, D123 of converter 1201 serve to protect the operational amplifier from possible high line voltage surges. Considerable design information on negative-immittance converters is available in the technical literature.

Although not heretofore stated, it is obvious that systems of this invention can be designed for use during only one telephone system state, e.g. OFH operation but not ONH operation.

As should be evident, systems of the present invention can be adapted to send a plurality of event signals over a single operational telephone line by incorporating conventional frequency and time division multiplexing methods. For example: amplitude-shift-keying (ASK), frequency-shift-keying (FSK) and, of course, frequency multiplexing. "Data Transmission," McGraw-Hill, 1965 by W. R. Bennett & J. R. Davey treats these and other modulation methods.

As is obvious, each event signal of a plurality must be uniquely encoded by the system's first unit so as to be discernable to the system's second unit, e.g. frequency multiplexing in which different frequencies and tuned circuits are used for each event.

Moreover, a plurality of systems could be used simultaneously on the same telephone line, e.g. a party line where two or more telephone subscribers use the same line. The principle of operation being the same as that for sending a plurality of event signals over a single telephone line.

Although the foregoing disclosure is illustrative of an alarm embodiment of the invention, it will be understood that systems of this invention could easily be adapted for the transmission of analog or continuous level signals.

For purposes of illustration, NPN (PNP) transistors are typically 2N4124 (2N4126), and diodes are typically IN4148 unless specified otherwise; the differential input operational amplifiers are monolithic type 741 (MC1741C) — "The Semiconductor Data Library," Motorola, Inc. 1972. The following values and types of circuit components in the schematic diagrams of FIGS. 6 thru 12 may be regarded as practical:

The DC blocking capacitors denoted by C are generally 10 uf.

| | |
|---|---|
| | IN FIGURE 6 |
| RESISTORS: | R61 = 3.9K<br>R62 = R63 = 5K (max., each)<br>R64 = 1.5K<br>R65 = 150 ohms<br>R66 = GE 1869 lamp<br>R67 = R611 = 4.7K (each)<br>R68 = 330K<br>R69 = 220K<br>R610 = R613 = 10K (each)<br>R612 = 1K<br>R614 = 15K |
| CAPACITORS: | C61 = C62 = 0.01 μf (each) |
| BATTERIES: | B1, B2 are 8.4 VDC (nickel-cadmium) |
| DIODES: | D61 is IN4004 |
| | IN FIGURE 7 |
| RESISTORS: | R701 = R710 = R711 = R712 = 33K (each)<br>R702 = 15K<br>R703 = 68K<br>R704 = R706 = R709 = R713 = 22K (each)<br>R705 = 1K<br>R707 = 390K<br>R708 = 130K |
| CAPACITORS: | C71 = 0.1 μf<br>C72 = 10 μf |
| | IN FIGURE 7A |
| RESISTORS: | R721 = 220K<br>R722 = 100K<br>R723 = 180K<br>R724 = 22K<br>R725 = 33K<br>R726 = 1.5K |
| CAPACITORS: | C73 = 0.1 μf |
| TRANSISTORS: | Q73 is 2N3439 |
| DIODES: | D74 is IN4004 |
| | IN FIGURE 7B |
| CAPACITORS: | C75 = 0.033 μf |
| INDUCTORS: | L75 = 50 mh |
| | IN FIGURE 7C |
| RESISTORS: | R771 = 47K<br>R772 = 330K<br>R773 = 1K<br>R774 = 100k<br>R775 = 6.8K |
| CAPACITORS: | C77 = 0.033 μf |
| INDUCTORS: | L77 = 50 mh |
| | IN FIGURE 8A |
| RESISTORS: | R81 = 3.3K<br>R82 = 5K (max.) |
| | IN FIGURE 8B |
| CAPACITORS: | C85 = C86 = 0.033 μf (each) |
| INDUCTORS: | L85 = L86 = 50 mh (each) |
| | IN FIGURE 9 |
| CAPACITORS: | C91 = C92 = 0.1 μf (each) |
| INDUCTORS: | L91 = L92 = 15 mh (each) |
| | IN FIGURE 10 |
| RESISTORS: | R101 = 50K (max.)<br>R102 = 1K<br>R103 = R104 = 47K (each) |
| CAPACITORS: | C101 = 0.033 μf |

-Continued

| | |
|---|---|
| | IN FIGURE 6 |
| INDUCTORS: | L101 = 50 mh |
| | IN FIGURE 11 |
| RESISTORS: | R110 = 10 ohms |
| | R111 = 50K (max.) |
| | R112 = R113 = 220K (each) |
| | R114 = 1K |
| | R115 = 150K |
| DIODES: | D111, D112 are 1N4001 |
| | IN FIGURE 12 |
| RESISTORS: | R121 = 1K (max.) |
| | R122 = R123 = 220K (each) |
| | R124 = 1K |
| | R125 = 10K |
| DIODES: | D121, D122, D123 are 1N4001 |

It can therefore be seen that I have provided a new and useful signal transmission system for use with operational telephone lines which not only has line surveillance capability, but is also relatively economical.

Since numerous designs will readily occur to those conversant in the art after consideration of the foregoing, the invention is not to be limited to what has been particularly shown and described, except as indicated in the appended claims.

I claim:

1. An electronic signal transmission system comprising a first unit, said first unit comprising a transmitter, a second unit, said second unit comprising a receiver matched to said transmitter, a telephone transmission line having two wires, conductive means connecting said first unit to said telephone line, conductive means cooperatively connecting said second unit to said telephone line, a telephone, a telephone exchange, said telephone line connecting said telephone and said telephone exchange, said telephone and said telephone line and said telephone exchange together defining a telephone system, said telephone exchange causing a DC bias current on said telephone line when said telephone is electrically connected to said line, said first and second units being of sufficiently high and balanced impedance to telephone system AC voltage on said line as to substantially reduce attenuation of said telephone system AC voltage and unbalancing of said line by said units, said transmitter comprising low-frequency means for modulating said telephone line in a way which is discernible to said receiver, said first unit being adapted to receive an event signal, said transmitter delivering a modulating signal current to said line in accordance with said event signal, said receiver delivering a counter-modulating signal current to said line in response to said modulating signal current, said counter-modulating signal current at least partially compensating for said modulating signal current and hence reducing voltage on said line due to said modulating signal current so as to reduce system modulation of the telephone system voltage on said line, said second unit providing an output signal related to said counter-modulating signal current, said output signal being electrically connectable to a suitable means for utilization.

2. The system of claim 1 in which said receiver comprises a one-port immitance network for realizing the AC component of said counter-modulating signal current.

3. The system of claim 1 in which said receiver comprises shunt-attenuating-amplifier circuitry including a reference voltage for realizing said counter-modulating signal current.

4. The system of claim 3 in which said shunt-attenuating-amplifier circuitry comprises a system-pass filter substantially passing that component of sensed telephone line voltage which is caused by the product of the system line current and the impedance of said telephone system to said current, said filter substantially blocking said telephone system voltage reaching the input of said filter.

5. The system of claim 1 in which said transmitter comprises a symmetrical three terminal transmitter, one of said terminals being a ground terminal, said transmitter being dualized so that the modulating current characteristics of each of the other two of said three terminals with respect to said ground terminal are at least nearly identical for nullifying voltage between the wires of said line caused by the product of said system line current and the impedance to said current.

6. The system of claim 1 further comprising: said telephone and said telephone exchange each defining a station, a telephone line filter means interposed between one of said stations and the closer unit line connection for isolating from said one of said stations voltage on said line caused by the product of said system line current and the impedance to said current.

7. The system of claim 3 further comprising: said receiver and said telephone line comprising a receiver and telephone line assembly, sampling means in said receiver and telephone line assembly for obtaining a measure of the system AC line current, and means forming a part of said receiver for transforming said measure to at least partially equal the voltage product of said system AC line current and the impedance to said current and superimposing this transformed measure onto said reference voltage of said shunt-attenuating-amplifier circuitry for proportionally shifting system AC line voltage at the first unit location to the second unit location.

8. The system of claim 1 further comprising: said receiver and said telephone line comprising a receiver and telephone line assembly, sampling means in said receiver and telephone line assembly for obtaining a measure of the system AC line current, and means forming a part of said receiver for transforming said measure to at least partially equal the voltage product of said system AC line current and the impedance to said current, and a voltage source equal to said voltage product disposed in series with said receiver for proportionally shifting said system AC line voltage at said first unit location to said second unit location.

9. The system of claim 1 further comprising: an impedance which is at least partially the negative of the impedance to said system AC line current disposed in series with said receiver and forming a part of said receiver for proportionally shifting said system AC line voltage at said first unit location to said second unit location.

10. The system of claim 1 further incorporating multiplex means in said units for the transmission of a plurality of said event signals.

* * * * *

UNITED STATES PATENT OFFICE
CERTIFICATE OF CORRECTION

Patent No. 3,872,253 Dated March 18, 1975

Inventor(s) John J. Jurschak

It is certified that error appears in the above-identified patent and that said Letters Patent are hereby corrected as shown below:

In the title [54] on the front page, line 5, delete "LINE".

Column 1, line 9, after "TELEPHONE" insert ---LINE---.

Column 1, line 11, delete "LINE".

Column 3, line 28, after "the telephone" insert ---line---.

Column 4, line 33, change "units" to ---unit's---.

Column 5, line 50, after "volts", insert ---,---.

Column 7, line 35, change "(208,209)" to ---(208,309)---.

Column 7, lines 63 and 64, change "name a counter-modulating current" to ---named a "counter-modulating" current---.

Column 14, line 38, change "shunt-attenuating-amplifier. In" to ---circuitry. In--.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,872,253 Dated March 18, 1975

Inventor(s) John J. Jurschak

It is certified that error appears in the above-identified patent and that said Letters Patent are hereby corrected as shown below:

Figures 6, 7, 7A, 7B, 7C, 8A, 8B, 9, 10, 11 and 12, should appear as shown on the attached sheets.

Signed and Sealed this

Fifth Day of October 1976

[SEAL]

*Attest:*

RUTH C. MASON
*Attesting Officer*

C. MARSHALL DANN
*Commissioner of Patents and Trademarks*